United States Patent [19]

Sekmakas

[11] Patent Number: 4,840,991
[45] Date of Patent: Jun. 20, 1989

[54] AQUEOUS DISPERSIONS OF PARTIALLY CROSS-LINKED EMULSION COPOLYMERS

[75] Inventor: Kazys Sekmakas, St. Petersburg Beach, Fla.

[73] Assignee: DeSoto, Inc., Des Plaines, Ill.

[21] Appl. No.: 935,722

[22] Filed: Nov. 28, 1986

[51] Int. Cl.$^4$ .............................................. C08K 43/00
[52] U.S. Cl. ................... 524/812; 524/831; 524/833
[58] Field of Search ................... 524/812, 833, 831

[56] References Cited

U.S. PATENT DOCUMENTS

| | | | |
|---|---|---|---|
| 2,544,691 | 3/1951 | Kugler et al. | 524/833 |
| 3,728,295 | 4/1973 | Skinner | 524/833 |
| 4,151,146 | 4/1979 | Patella | 524/833 |
| 4,151,147 | 4/1979 | Neuschwanter et al. | 524/833 |
| 4,218,356 | 8/1980 | Evans et al. | 524/812 |
| 4,234,467 | 11/1980 | Ryrfors et al. | 524/833 |
| 4,322,328 | 3/1982 | Graetz et al. | 524/833 |
| 4,336,172 | 6/1982 | Marquardt et al. | 524/833 |
| 4,371,636 | 2/1983 | Distler et al. | 524/833 |

FOREIGN PATENT DOCUMENTS

| | | | |
|---|---|---|---|
| 0766431 | 10/1971 | Belgium | 524/833 |
| 0120713 | 9/1979 | Japan | 524/833 |
| 0137906 | 7/1985 | Japan | 524/833 |
| 1170514 | 11/1969 | United Kingdom | 524/833 |

*Primary Examiner*—Joseph L. Schofer
*Assistant Examiner*—J. M. Reddick
*Attorney, Agent, or Firm*—Dressler, Goldsmith, Shore, Sutker & Milnamow, Ltd.

[57] ABSTRACT

Aqueous dispersions of partially cross-linked copolymer particles useful in aqueous coating compositions is produced by copolymerizing in aqueous emulsion a mixture of: (A) from 1% to 30% of polyethylenically unsaturated monomer; (B) from 3% to 30% of hydroxy-functional monoethylenically unsaturated monomer; (C) from 0.5% top 10% of a salt-forming monoethylenically unsaturated monomer selected from monoethylenic carboxylic acid monomer and monoethylenic amine monomer; and (D) the balance of the copolymer consisting essentially of copolymerizable monoethylenically unsaturated monomer, preferably nonreactive monomer such as vinyl acetate. The copolymer particle-containing suspension produced by the emulsion copolymerization is coagulated with water immiscible organic solvent which is a poor solvent for the copolymer, such as butanol, to provide a liquid phase containing coagulating solvent and the water and surfactants used in the emulsion copolymerization and a coagulum of the copolymer particles in the suspension. This coagulum, after removal of the liquid phase, is dispersed in water with the aid

11 Claims, No Drawings

AQUEOUS DISPERSIONS OF PARTIALLY CROSS-LINKED EMULSION COPOLYMERS

TECHNICAL FIELD

This invention relates to aqueous dispersions of partially cross-linked emulsion copolymers and to thermosetting coating compositions and electrocoat baths containing the same.

BACKGROUND ART

Coatings applied from aqueous medium have become of increasingly greater importance, but the aqueous coatings known to the art have significant limitations, as will be discussed.

Aqueous emulsion copolymers have been used in latex form, but these systems are suspensions of polymer particles which are stabilized in the aqueous medium by surfactants, and the surfactants are water sensitive and limit the utility of the coatings. Also, most latex coatings are thermoplastic, and this limits the solvent resistance and physical toughness of the coatings. Moreover, efforts to directly use the colloidal dispersions containing anionic or cationic surfactants in electrocoating have failed because film build is excessive and the deposited films are porous.

It has also been possible to disperse relatively low molecular weight copolymers made by polymerization in organic solvent solution in water by including carboxylic acid groups or amine groups in the relatively low molecular weight copolymer which is formed. Such copolymers containing the described groups which will form salts when reacted with acids or bases were then dispersed in water in salt form with the aid of a water-miscible organic solvent. The resulting aqueous compositions might be characterized as solutions or dispersions, depending upon the particle size and clarity thereof. In normal practice, a reactive monomer, such as an hydroxyl-functional monomer is also included in the copolymer, and these copolymers are useful to provide thermosetting coatings after the inclusion of a curing agent in the aqueous medium.

Unfortunately, the desired properties in these coatings had to be provided by the cure, for the copolymers which were dispersed in water by salt formation in the presence of organic solvent had to be of low molecular weight and an extensive cure was needed to build the molecular weight and cross-link density needed to provide a physically tough film. This required excessive amounts of curing agents, thus limiting the balance of hardness, flexibility and chemical resistance which could be obtained.

It is desired to use partially cross-linked copolymers of higher molecular weight which are substantially free of surfactants so that the use of curing agents can be either minimized or eliminated. In this way, copolymers having new properties are provided which form superior coatings and which can be added to electrocoat baths to improve coating performance, especially salt spray resistance and edge corrosion protection.

DISCLOSURE OF INVENTION

In accordance with this invention, an aqueous dispersion of partially cross-linked copolymer particles is produced by copolymerizing in aqueous emulsion a mixture of: (A) from 1% to 30% of polyethylenically unsaturated monomer; (B) from 3% to 30% of hydroxy-functional monoethylenically unsaturated monomer; (C) from 0.5% to 10% of a salt-forming monoethylenically unsaturated monomer selected from monoethylenic carboxylic acid monomer and monoethylenic amine monomer; and (D) the balance of the copolymer consisting essentially of copolymerizable monoethylenically unsaturated monomer. The emulsion copolymerization is conventional and an anionic surfactant is usually used to minimize the particle size of the copolymer particles which are produced, albeit sufactant selection is secondary because the surfactant is largely removed before the copolymer particles are used.

The copolymer particle-containing surfactant-stabilized aqueous suspension produced by the emulsion copolymerization is then coagulated by the addition of an organic solvent which is a poor solvent for the copolymer (such as butanol). After the butanol is added, the composition is allowed to settle which provides a liquid phase containing most of the coagulating solvent and the water and surfactants used in the emulsion copolymerization. The coagulating solvent is preferably water immiscible. The coagulum of the copolymer particles is a mass of finely divided particles. This coagulum, after removal of the liquid phase (it is simply poured off), is dispersed in an active solvent which forms a suspension of the copolymer particles in the added solvent. This suspension is then dispersed in water with the aid of a salt-forming volatile acid or a volatile base. The active solvent is preferably water-miscible and is illustrated by ethoxy or butoxy ethanol or methyl amyl ketone. The water-miscible solvent is used in an amount insufficient by itself to dissolve the coagulum, and is preferably used in an amount less than about 30% of the weight of the copolymer.

The polyethylenically unsaturated monomer may be of diverse type, the proportion thereof being selected to minimize the insolubility of the copolymer since it is preferred that the copolymer absorb some of the water-miscible solvent so as to swell the copolymer particles by at least about 30%. However, some significant cross-linking is essential because, in the absence of cross-linking, the copolymer is rubbery and does not form a uniform dispersion in water when an effort is made to achieve this. This is particularly true when the proportion of organic solvent is limited so as not to exceed about 30% of the weight of the copolymer.

While the polyethylenically unsaturated monomer can vary considerably, as will be discussed, it is preferred to employ a polyethylenically unsaturated monomer which is a dimaleate or difumarate of a trihydric alcohol, preferably glycerin. The preferred polyethylenically unsaturated monomer is the ester reaction product of glycerin with two molar proportions of a $C_1$–$C_{18}$ monoalkyl maleate, preferably monobutyl maleate. Other polyethylenically unsaturated monomers which may be used are preferably diethylenic, and are illustrated by 1,6-hexane diol diacrylate, 1,4-butane diol diacrylate, glyceryl diacrylate, butylene glycol diallyl ether, glyceryl diallyl ether, divinyl benzene, and trimethylol propane diallyl ether. The corresponding methacrylate esters and methallyl ethers are also useful. It is stressed, however, that emulsion copolymers containing polyethylenically unsaturated monomers are themselves known, albeit these have been previously used in solvent dispersions, and not in surfactant-free aqueous dispersions.

These polyethylenically unsaturated monomers are preferably used in an amount of from 3% to 15% in order to have an adequate cross-link density without unduly minimizing solvent swellability.

In the prior use of monoethylenically unsaturated carboxylic acids, such as acrylic acid or methacrylic acid, to form aqueous coating dispersions, one not only had to use more organic solvent than is preferred herein, but one also had to normally use more than about 5% of the carboxylic acid or amine monomer in order to adequately solubilize the neutralized emulsin copolymer. It is a feature of this invention to provide stable aqueous dispersions using a smaller proportion of monoethylenically unsaturated acid or amine monomer, namely: from 1.0% to 5%. It is surprising to find that such a small amount of carboxylic acid or amine monomer will stabilize the partially cross-linked high molecular weight emulsion copolymers which are formed herein. Of course, these small amounts of salt-forming groups would not stabilize the copolymer in the absence of cross-linking which would normally be thought to make stable dispersion more difficult.

Referring more particularly to the monoethylenic carboxylic acid monomer, these are preferably constituted by acrylic or methacrylic acid, but other monoethylenic acids, like crotonic acid, itaconic acid, maleic acid, fumaric acid, monobutyl maleate, and the like, are also useful. The proportion of carboxylic acid is far more important herein than the selection of the acid.

Referring more particularly to the monoethylenic amine monomer, these may be primary, secondary or teriary amines, preferably the latter. These are illustrated by dimethylaminoethyl acrylate, methacrylate, acrylamide and methacrylamide, though the corresponding aminopropyl compounds and diethylamine compounds are also useful. Dimethylaminopropyl methacrylamide is presently preferred and will be used as illustrative. Again, the selection of the amine is less important than its proportion of use.

Referring more particularly to the hydroxy-functional monoethylenically unsaturated monomer, various monomers are readilY available in this category, hydroxyethyl acrylate and hydroxyethyl methacrylate being illustrative. One may also use the corresponding hydroxypropyl and hydroxybutyl acrylates and methacrylates. Hydroxypropyl methacrylate is presently preferred and will be used as illustrative. Monohydric monomers are preferred, but one could use the monoacrylate of glycerin.

The hydroxy monomer provides the polymer particles with a degree of hydrophilicity as well as reactive sites for subsequent cure with an appropriate curing agent, and is preferably present in an amount of from 5% to 20%.

Aside from the hydroxy monomer, it is preferred that the monoethylenically unsaturated monomer (or mixture of monomers) constituting the balance of the copolymer be nonreactive. This means that the single ethylenically unsaturated group contained in the monomer is the only reactive group therein, as is the conventional meaning of this language. On the other hand, it is possible to include small proportions of other reactive groups, especially the N-methylol group, particularly after said group has been etherified with an alcohol, like butanol, to minimize premature reaction. Butoxymethyl acrylamide will illustrate the reactive monomers which may be used.

In preferred practice, the nonreactive monomer is present in an amount of at least 25% of the copolymer. Typical nonreactive monomers are styrene, vinyl toluene, acrylate and methacrylate esters like methyl methacrylate, ethyl acrylate, butyl acrylate or methacrylate, and vinyl acetate. These are usually used in admixture to provide copolymers having the desired hardness.

The carboxyl-functional copolymers are converted into salt form by reaction with a volatile amine which is preferably ammonia, but which may also be triethyl amine, diethanol amine, triethanol amine, and the like. The volatile amines which can be used to disperse carboxyl-functional copolymers in water are well known and any of these may be used. Neutralization may be complete or partial, as desired.

The amine-functional copolymers are converted into salt form by reaction with a volatile acid, which is preferably acetic acid, but which may also be dimethylol propionic acid. The volatile acids which can be used to disperse amine-functional copolymers in water are well known and any of these may be used. Again, neutralization may be complete or partial, as desired.

As previously indicated, the proportion of the water-miscible organic solvent should be minimized, but at least some is normally needed to achieve a stable aqueous dispersion. Thus, the water-miscible solvent is desirably present in an amount of from about 5% to 30% of the weight of the copolymer. As previously indicated, it is important in some instances to minimize the presence of volatile organic solvent, and this is uniquely achieved in this invention, as has been explained. On the other hand, when the copolymers of this invention are used as an additive in small proportion to an aqueous thermosetting composition dominated by other resins, then much larger amounts of organic solvent may be tolerated. Typical water-miscible active solvents have been noted previously, and these can be used alone or in admixture.

The aqueous dispersions of this invention are useful in aqueous coatings of diverse type. Thus, they can be used as additives in thermosetting aqueous coatings of conventional character in which an hydroxy-functional copolymer is dispersed in the aqueous medium together with a curing agent, the dispersions of this invention serving to improve the characteristics of the baked coating. On the other hand, the dispersions of this invention can entirely replace the conventional hydroxy-functional copolymer.

The coatings may be applied in conventional fashion, as by spray, brush or roller, or one can incorporate the dispersions of this invention into electrocoating baths. When this is done, the carboxyl copolymers of this invention deposit upon the anode, and the amine copolymers of this invention deposit upon the anode. The copolymers of this invention may be used to provide only a portion of the film-forming resin in the bath, e.g., from 3% to 25%, or they may constitute most of the film-forming resin, e.g., 75% to 100%. Intermediate proportions are also useful.

The curing agents are entirely conventional, reference being made to aminoplast resins, phenoplast resins and blocked polyisocyanates. All of these are well known in aqueous coatings, and they will be illustrated herein by hexamethoxymethyl melamine. They are used herein in relatively small amounts of from 2% to 20% of the total weight of resin solids, including the curing agent.

Epoxy phosphates are desirably present in the thermosetting aqueous coatings under consideration since they improve and speed the cure. These are also known per se.

All properties herein are by weight, unless otherwise specified, and the invention is illustrated in the examples which follow.

EXAMPLE 1

1280 parts of deionized water together with 10 parts an anionic surfactant (Aerosol 501) are chrarged to a reactor and heated to 80° C.

There are separately premixed 143 parts of deionized water and 8 parts of ammonium persulfate to provide a catalyst solution. 10 parts of this catalyst solution are then added to the reactor at 80° C. The balance of the catalyst solution is added slowly at the same time that the monomer preemulsion to be described is added.

A monomer preemulsion is formed by mixing 1080 parts of deionized water, 20 parts of Aerosol 501, 223.8 parts of styrene, 302 parts of ethyl acrylate, 51.5 parts of hydroxypropyl methacrylate, 29.8 parts of the reaction product of 2 moles of monobutyl maleate with one mol of glycerin, 12.4 parts of acrylic acid, and 4 parts of a 70% water solution of teritary-butyl-hydroperoxide. This preemulsion is slowly added to the reactor while the balance of the catalyst premix is simultaneously added.

The simultaneous addition is carried out over a four hour period during which the temperature in the reactor is maintained at 85° C. After addition is complete, a final catalyst mixture is added over 40 minutes (0.8 parts of ammonium persulfate in 15 parts of deionized water) and when this addition is complete, the reactor is allowed to cool to 30° C. The product was a milky latex.

The above aqueous emulsion is coagulated by the addition of butanol which causes the copolymer particles to settle as a separate layer at the bottom of a settling tank, and the liquid mixture of water, surfactant and alcohol is decanted off. 2-butoxy ethanol is then added in an amount of 15% of the weight of the copolymer to redisperse the copolymer particles, ammonia is added to neutralize the acidity, and deionized water is added to provide a dispersion having a resin solids content of 10%. The aqueous dispersion product is a valuable additive in amounts of 3% to 30% of total resin solids for copnventional anodic electrocoat baths, serving to enhance salt spray resistance and edge corrosion resistance.

EXAMPLE 2

Repeating Example 1 without the dimaleate, the copolymer was rubbery and could not be satisfactorily dispersed in water.

EXAMPLE 3

Example 1 is repeated using 12.4 parts of dimethylaminopropyl methacrylamide in place of the acrylic acid used in Examole 1. The coagulum in this example is neutralized with acetic acid. Corresponding results are obtained, albeit the product here is added to a conventional cathodic electrocoat bath.

EXAMPLE 4

The crosslinked aqueous polymer dispersion of Example 1 mixed with hexamethoxymethyl melamine curing agent, the melamine being added to provide a weight ratio of crosslinked polymer to melamine curing agent of 80:20. The aqueous thermosetting coating so-provided can be applied on any metal substrate, such as steel, aluminum or tin plated steel. Application may be carried out by spray, flow-coat or electrocoat methods, or in any other desired manner.

To illustrate coating application, the described coating solution was successfully flow-coated onto an aluminum panel and the coating was then cured in an electric oven maintained at 375° F. for 15 minutes. The results which were obtained are as follows:

| | |
|---|---|
| Film thickness (mil) | 0.5 |
| Pencil hardness | H |
| Flexibility (¼" conical mandrel) | Pass |
| resistance - Passed 50 double rubs with methyl ethyl ketone saturated cloth | |
| No objectionable odor was present in the cured coating | |

EXAMPLE 5

The monomers used in Example 1 are copolymerizedin aqueous emulsion as shown in Example 1, but using a larger proportion of water to provide a latex having a solids content of about 20.0%. 700 grams of this latex containing 140 grams of resin solids are mixed with 150 grams of n-butanol at room temperature while stirring. Addition of butanol is over a period of about 5 minutes. The particles of latex settle to form a coagulated mass at the bottom of the settling vessel beneath a clear liquid layer of butanol dissolved in water and containing the surfactants and other water-soluble materials used in the aqueous emulsion copolymerization. This liquid layer is then decanted to leave a mass of resin particles wet with a small amount of water and butanol. This wet mass is like a dough, but the particles of cross-linked resin are not coalesced in that wet mass.

The resin particles in this wet mass are then redispersed by adding an active organic solvent, namely: 2-butoxy ethanol. For electrocoat purposes, the proportion of solvent is desirably minimized to provide a solvent dispersion of from paste consistency having a solids content of from 50% to about 80%. To illustrate: add 40 gms. 2-butoxy ethanol to 140 grams of the wet, dough-like resin mass obtained in this Example. This yields a viscous white-appearing opaque paste containing little excess solvent (77% solids).

As a matter of interest, if additional 2-butoxy ethanol is added to provide a dispersion containing 15% solids in the dispersing solvent, the dispersion is transuluscent, suggesting considerable absorption of added solvent to swell the copolymer particles in the dispersion.

This solvent dispersion is converted into an aqueous electrocoating bath by adding 88 gms. deionized water and enough diethanol amine to neutralize 50% of the acrylic acid in the copolymer. The neutralized copolymer particles form a stable milky-appearing aqueous dispersion having a pH of about 7 and a solids content of about 10%. Curing agent is added to the solvent dispersion before the addition of acid and water, but it can be added at any time. In this example, hexamethoxymethyl melamine is used in an amount of 5% based on the total weight of resin present. This is a much smaller amount than is normally required for a good cure.

A unidirectional electrical current is then passed through the bath and through a steel panel as anode to electrodeposit a film onto the steel panel. Using an electrical current having an initial voltage of 50 volts for 1 minute, a relatively thick film is deposited. The coated panels are then removed, washed with deionized water and then baked 20 min. at 400° F. The result is a continuous hard film slightly over 1 mil thick and having a rough surface. All portions of the panel are completely covered.

Accordingly, the cross-linked copolymer particles of this invention with only 2% of copolymerized acrylic acid are effectively electrocoated onto the anode and the baked film of these deposited particles is continuous and possessed reasonably good properties.

What is claimed is:

1. An aqueous dispersion of partially cross-linked copolymer particles produced by copolymerizing in aqueous emulsion a mixture of: (A) from 1% to 30% of a dimaleate or difumarate of a trihydric alcohol; (B) from 3% to 30% of hydroxy-functional alkyl acrylate or methacrylate; (C) from 0.5% to 10% of a salt-forming monoethylenically unsaturated monomer selected from monoethylenic carboxylic acid monomer and monoethylenic amine monomer selected from alkylamine acrylates, methacrylates, acrylamides, and methacrylamides; and (D) the balance of the copolymer consisting essentially of at least about 25% of nonreactive copolymerizable monoethylenically unsaturated monomer, said monomers in the absence of the cross-linking provided by said component (A) providing a rubbery copolymer, the copolymer particle-containing suspension produced by said emulsion copolymerization being coagulated with water immiscible organic solvent which is a poor solvent for the copolymer to provide a liquid phase containing the coagulating solvent and the water and surfactants used in said emulsion copolymerization and a coagulum of the copolymer particles therein, said coagulum, after removal of said liquid phase, being dispersed in water with the aid of a salt-forming volatile acid or a volatile base and a water-miscible organic solvent, said last-named solvent being present in said aqueous dispersion in an amount insufficient by itself to dissolve said coagulum in the absence of said salt-forming acid or base.

2. An aqueous dispersion as recited in claim 1 in which said trihydric alcohol is glycerin.

3. An aqueous dispersion as recited in claim 1 in which said component (A) is the ester reaction product of glycerin with two molar proportions of a monoalkyl maleate.

4. An aqueous dispersion as recited in claim 1 in which said monoethylenically unsaturated acid or amine monomer is present in an amount of from 1.0% to 5% of the copolymer.

5. An aqueous dispersion as recited in claim 1 in which said said water-miscible organic solvent is present in an amount of from about 5% to 30% of the weight of the copolymer.

6. An aqueous dispersion as recited in claim 1 in which said copolymer contains from 5% to 20% of hydroxy-functional acrylate or methacrylate monomer.

7. An aqueous dispersion as recited in claim 1 in which there is present from 1% to 5% of acrylic or methacrylic acid.

8. An aqueous dispersion as recited in claim 1 in which said hydroxyalkyl acrylate or methacrylate is hydroxyethyl acrylate or methacrylate.

9. An aqueous dispersion as recited in claim 1 in which said component A is present in an amount of from 3% to 15%.

10. An aqueous dispersion of partially cross-linked aqueous emulsion copolymer particles which is substantially free of surfactants and in which the copolymer particles are produced by copolymerizing in aqueous emulsion in the presence of an anionic surfactant a mixture of: (A) from 1% to 30% of a dimaleate or difumarate of a trihydric alcohol; (B) from 3% to 30% of hydroxy-functional alkyl acrylate or methacrylate; (C) from 0.5% to 10% of a salt-forming monoethylenically unsaturated carboxylic acid monomer; and (D) the balance of the copolymer consisting essentially of at least about 25% of nonreactive copolymerizable monoethylenically unsaturated monomer, said monomers in the absence of the cross-linking provided by said component (A) providing a rubbery copolymer, said aqueous emulsion copolymer particles being dispersed in water with the aid of a salt-forming volatile base and a water-miscible organic solvent which is present in said aqueous dispersion in an amount insufficient by itself to dissolve said copolymer in the absence of said salt-forming base.

11. An aqueous dispersion as recited in claim 10 in which said component A is present in an amount of from 3% to 15%, said monoethylenically unsaturated acid monomer is present in an amount of from 1.0% to 5% of the copolymer, said water-miscible organic solvent is present in an amount of from about 5% to 30% of the weight of the copolymer, and said copolymer contains from 5% to 20% of hydroxy-functional alkylacrylate or methacrylate monomer.

* * * * *

UNITED STATES PATENT AND TRADEMARK OFFICE
CERTIFICATE OF CORRECTION

PATENT NO. : 4,840,991

DATED : June 20, 1989

INVENTOR(S) : Kazys Sekmakas

It is certified that error appears in the above-identified patent and that said Letters Patent is hereby corrected as shown below:

Col. 3, line 30, "teriary" should be --tertiary--.
Col. 3, line 40, "readilY" should be --readily--.
Col. 5, line 1, "properties" should be --proportions--.
Col. 5, line 22, "teritary" should be --tertiary--.
Col. 5, line 44, "copventional" should be --conventional--.
Col. 5, line 56, "Examole" should be --example--.
Col. 5, line 62, "crosslinked" should be --cross-linked--.
Col. 5, line 63, after "I" insert --was--.
Col. 5, line 65, "crosslinked" should be --cross-linked--.
Col. 6, line 13, before the word "resistance" insert --solvent--.
Col. 6, line 20, "copolymerizedin" should be --copolymerized in--.
Col. 8, line 8, delete "said" first usage.
In the Abstract, line 7, "top" should be --to--.
In the Abstract, last line, after "aid" insert --of a salt-forming volatile acid or a volatile base and a water-miscible organic solvent, said last-name solvent being present in the aqueous dispersion in an amount insufficient by itself to dissolve the coagulum in the absence of the salt-forming acid or base.--

Signed and Sealed this

Fourteenth Day of August, 1990

Attest:

HARRY F. MANBECK, JR.

Attesting Officer

Commissioner of Patents and Trademarks